(12) United States Patent
Upalekar et al.

(10) Patent No.: US 12,494,950 B2
(45) Date of Patent: Dec. 9, 2025

(54) CHANNEL ESTIMATION THROUGH DYNAMIC ALLOCATION IN DOWNLINK TRANSMISSION FOR MULTI-USER, MULTIPLE-INPUT, MULTIPLE-OUTPUT (MU-MIMO) SYSTEMS

(71) Applicant: TEJAS NETWORKS LIMITED, Bengaluru (IN)

(72) Inventors: Divya Upalekar, Bangalore (IN); Shrinivas Bhat, Bangalore (IN); Abhay Mohan M V, Chennai (IN); Preethi R, Chennai (IN); Giridhar K, Chennai (IN)

(73) Assignee: TEJAS NETWORKS LIMITED, Bengaluru (IN)

(*) Notice: Subject to any disclaimer, the term of this patent is extended or adjusted under 35 U.S.C. 154(b) by 435 days.

(21) Appl. No.: 18/131,312

(22) Filed: Apr. 5, 2023

(65) Prior Publication Data
US 2023/0327917 A1  Oct. 12, 2023

(30) Foreign Application Priority Data

Apr. 6, 2022  (IN) .............. 202241020727

(51) Int. Cl.
| | |
|---|---|
| *H04L 1/00* | (2006.01) |
| *H04B 7/0452* | (2017.01) |
| *H04J 13/18* | (2011.01) |
| *H04L 5/00* | (2006.01) |
| *H04L 25/02* | (2006.01) |
| *H04W 72/12* | (2023.01) |
| *H04W 72/232* | (2023.01) |

(52) U.S. Cl.
CPC ....... *H04L 25/0224* (2013.01); *H04B 7/0452* (2013.01); *H04J 13/18* (2013.01); *H04L 1/0061* (2013.01); *H04L 5/0051* (2013.01); *H04W 72/12* (2013.01); *H04W 72/232* (2023.01); *H04L 1/0003* (2013.01)

(58) Field of Classification Search
None
See application file for complete search history.

(56) References Cited

U.S. PATENT DOCUMENTS

2020/0336355 A1* 10/2020 Yamada ............... H04B 7/0456
2021/0168777 A1*  6/2021 Kim ..................... H04L 5/0051

* cited by examiner

*Primary Examiner* — Abdelillah Elmejjarmi
(74) *Attorney, Agent, or Firm* — HSML P.C.

(57) ABSTRACT

A system and method for enabling downlink signal transmission in a Multiple-Input Multiple-Output (MU-MIMO) system is provided. The method comprises of creating a scheduling information based on MU-MIMO Scheduling of a plurality of User equipments (UES), multiplexing the plurality of UES paired based on the scheduling decisions across time, frequency and code, inputting transport blocks of each UE pushed on to a Downlink shared channel (DLSCH), performing bit processing of each of the CRC encoded UEs, inputting Code-rate (MCS) for data modulation mapping on a post bit processed data, assigning DM-RS ports to the UE based on allocated MCS and number of antenna ports from a scheduling information structure, adding, a Partial Port Occupancy information (P-Poi) for each UE along with the scheduler information structure required for demodulation at UE and enabling optimal channel estimation at UE by adding new DM-RS port combinations using reserved fields in the DCI messaging.

18 Claims, 7 Drawing Sheets

CHANNEL ESTIMATION THROUGH DYNAMIC ALLOCATION IN DOWNLINK TRANSMISSION FOR MULTI-USER, MULTIPLE-INPUT, MULTIPLE-OUTPUT (MU-MIMO) SYSTEMS

CROSS-REFERENCE TO RELATED APPLICATIONS

This application claims priority to Indian provisional patent application no. 202241020727 filed on Apr. 6, 2022, the complete disclosure of which, in their entirety, is herein incorporated by reference.

BACKGROUND

Technical Field

The embodiments herein generally relate to wireless communication systems and methods, and more particularly, to intelligent reference signal port allocation to facilitate channel estimation and to improve throughput and fairness in MU-MIMO systems.

Description of the Related Art

In modern wireless communication systems, the downlink receptions are facilitated by channel estimation and symbol detection based on reference signals typically called DMRS (Demodulation Reference Signals) in 5GNR systems. To facilitate multi-user MIMO, the reference signals assigned for layers of each user for channel estimation, are expected to be orthogonal by design. The orthogonality of these references is achieved by allocating each layer of the users, the reference signals are orthogonal in time, frequency, and codes (CDM). This kind of allocation of reference signals (typically referred to as ports) involve performance trade-offs, especially in MU-MIMO scenarios.

Channel estimation reference signals for different users or different layers of the same user often occupy the same time-frequency resources in an OFDM-based downlink system. Such reference signals, or pilots, are said to adopt a pilot-on-pilot arrangement since pilots fall on top of each other. Without appropriate signal processing in the receiver, this will lead to interference between the pilots that share a particular set of time-frequency resources.

In current channel estimation schemes especially in the MU-MIMO Scenarios, Demodulation reference signal (often called DM-RS in 5G) used for Channel estimation typically use the Orthogonal Cover Codes (OCC) based on Walsh Spreading to separate out either the users or the ports of a user. The Walsh code generation can be visualized in the form of the nested code tree structure. These reference signals apply CDM spreading across time-frequency to enable multiple users or layers to share the same time-frequency resources. The term DM-RS port is used to refer to a pilot sequence spread with a particular OCC and placed in a specific set of subcarrier indices, the maximum of which defines the maximum number of users or layers that can be loaded in MU-MIMO. During the Channel estimation process, the channel estimate is assumed to be constant across the time-frequency grid spanned by the CDM group. The spreading remains the same even when the number of users or layers in the MU-MIMO is lower than the total number of DM-RS ports that are available.

Figure 1:
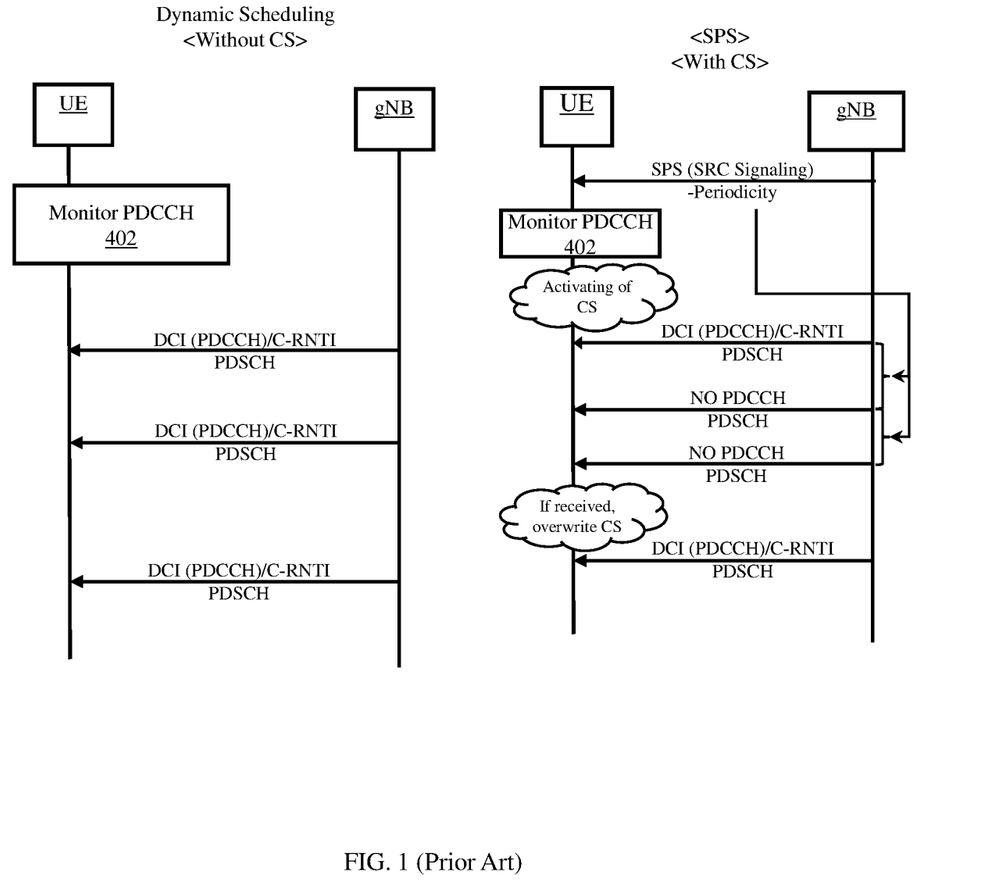
FIG. 1 is a signal flow diagram illustrating transmission of scheduling information and corresponding Protocol Data Unit (PDU) in a downlink, according to a prior art illustration.
Figure 2A:
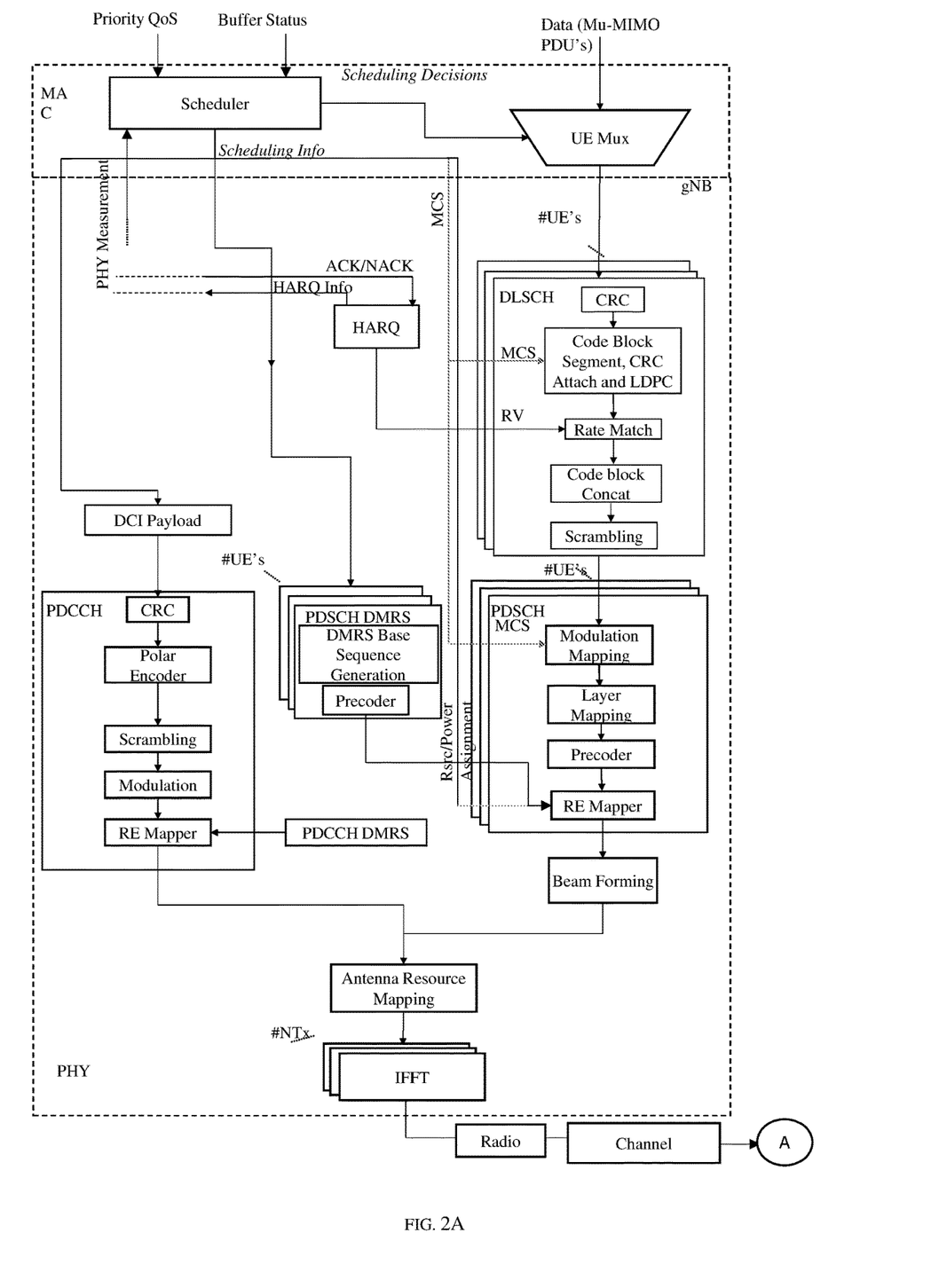
FIGS. 2A-2B are block diagrams illustrating downlink transmission in MU-MIMO systems according to a prior art illustration.
Figure 2B:
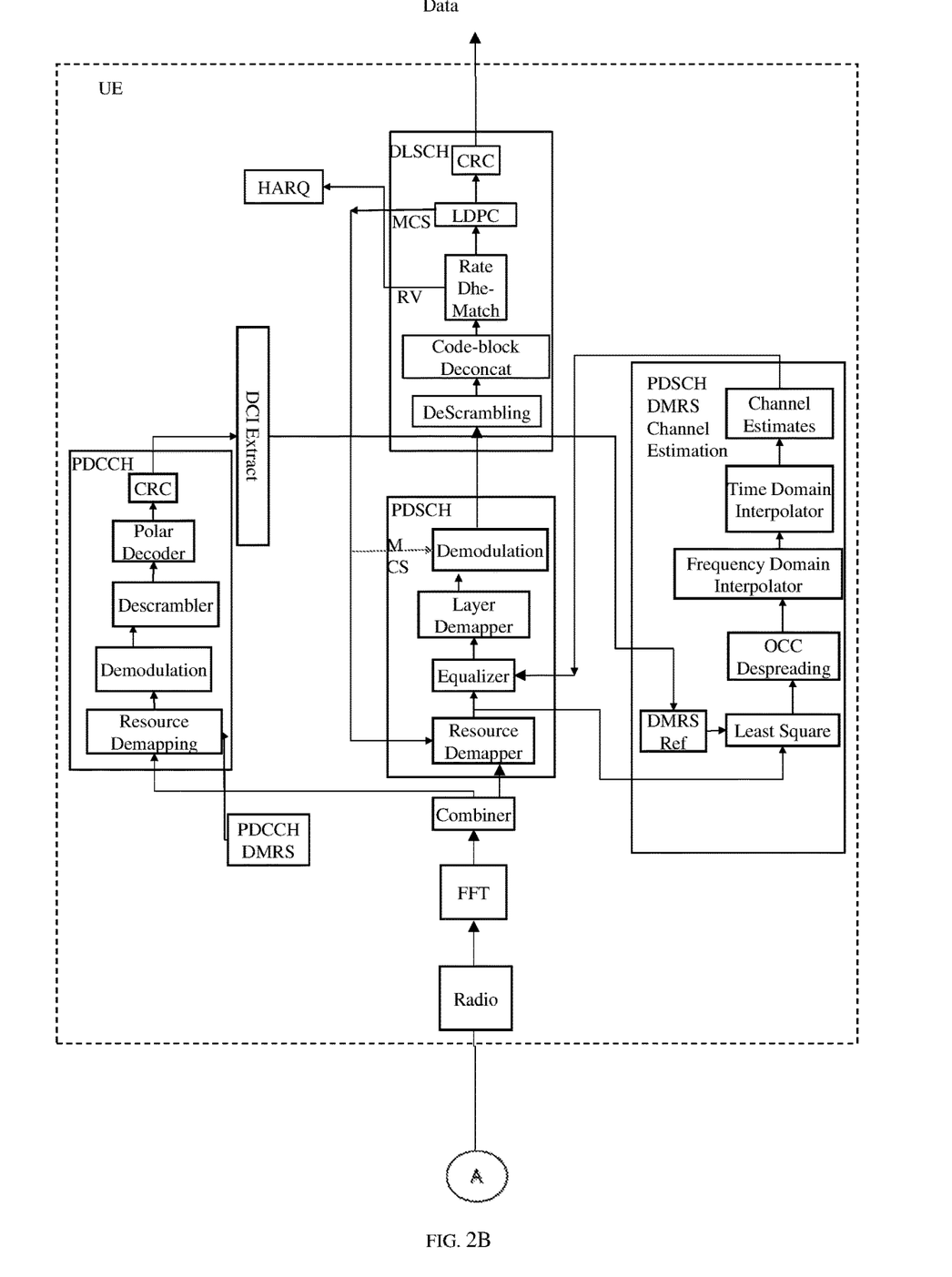

FIG. 1 is a flow diagram illustrating scheduling information and corresponding PDU in the downlink, according to a prior art illustration. The sequence of the signalling flow for downlink channel between the User Equipment (UE) 102 and Base station (eNodeB) 104 for both Dynamic scheduling (DS) and Semi-persistent scheduling (SPS) is as depicted in FIG. 1. The Downlink scheduling information in the Downlink Control Information (DCI) is scrambled with Cell Radio Network Temporary Identifier (C-RNTI or CS-RNTI) sent on physical downlink control channel (PDCCH) 106 is transmitted along with Protocol Data Unit (PDU) transmissions in the Physical Uplink Shared Channel (PUSCH) Channel. FIGS. 2A-2B are block diagrams illustrating downlink transmission in MU-MIMO systems, according to a prior art illustration.

Accordingly, there is a need to mitigate and/or overcome drawbacks associated with current systems and methods for enhancing channel estimation quality of selected DM-RS ports in Downlink for partially loaded DM-RS ports without compromising the channel estimation performance on the other ports.

SUMMARY

Embodiments herein facilitate the communications network to enable improved Channel estimation quality of in Downlink for partially loaded DM-RS ports, without compromising the estimation performance on the other ports which do not benefit from the improved performance.

According to an aspect of the present disclosure, embodiments herein disclose a method of enabling downlink signal transmission in a Multiple-Input Multiple-Output (MU-MIMO) system. The method comprising steps of creating, by a base station scheduler, a scheduling information based on MU-MIMO Scheduling of a plurality of User equipments (UES), multiplexing, by a UE multiplexer, the plurality of UES paired based on the scheduling decisions across time, frequency and code, inputting, to a Cyclic Redundancy Check (CRC) unit, transport blocks of each UE pushed on to a Downlink shared channel (DLSCH), performing bit processing of each of the CRC encoded UEs, inputting, to a data modulator, Code-rate (MCS) for data modulation mapping on a post bit processed data, assigning, by a Scheduling Aware UE Port Mapping Unit, DM-RS ports to the UE based on allocated MCS and number of antenna ports from a scheduling information structure, adding, a Partial Port Occupancy information (P-Poi) for each UE along with the scheduler information structure required for demodulation at UE, enabling optimal channel estimation at UE by adding new DM-RS port combinations using reserved fields in the DCI messaging, creating DM-RS references for each UE based on a DM-RS base sequence followed by a CDM Spreading according to a port assignment, mapping the DM-RS references to resource elements based on DM-RS configurations from the scheduling information structure, adding, by a partial port occupancy information unit, a Partial Port Occupancy information (P-Poi) along with the scheduler information structure that is required at the UE for demodulation and transmitting the scheduling information along with the per UE P-Poi to the UE over a communication channel.

According to the embodiments herein, transmission of data corresponding to a specific RV index is managed by a Hybrid automatic repeat request (HARQ) process, where HARQ process for each transport block is managed by storing different Redundancy version (RV) of the data for each code-block corresponding to the transport block for retransmissions.

According to the embodiments herein, the HARQ retransmissions are scheduled based on the CRC failures and data corresponding to HARQ process maintained in an HARQ Buffer.

According to the embodiments herein, the method further comprises combining, a Physical Downlink Shared Channel (PDSCH) data generated for a radio processing in a radio processor. The Physical Downlink Control Channel (PDCCH) processor comprises of a Cyclic Redundancy Check (CRC) Unit, a Polar Encoder, Scrambling Unit, Modulation Unit and Resource Mapper Unit for redundancy checking, Polar Encoding, Scrambling Modulation and Resource Mapping of the scheduling information and to transmit the scheduling information along with the per UE P-POI to the UE over a communication channel.

According to the embodiments herein, bit processing of the CRC encoded UES comprises of Code Block segmentation, CRC attach and low-density parity-check (LDPC) Encoding in a Code Block unit, Rate-Matching in the rate-matching unit and Code-block concatenation in the code block concatenation unit and Scrambling in a scrambling unit.

According to the embodiments herein, the DM-RS ports are assigned based on one or more of UEs, corresponding data layers, allocated MCS and number of antenna ports from a Scheduling Information structure. The DM-RS channel estimation comprises of Least square (LS) estimation, Variable Spreading Factor OCC (VSFOCC) Despreading, Frequency domain interpolation (post denoising) and time axis interpolation across OFDM symbols.

According to the embodiments herein, the method further comprises inputting the channel estimates to one or more of an equalizer unit, layer mapper unit, a demodulator unit, a descrambler unit, a code-block de-segmented unit, a rate de-match unit, an LDPC processor and a CRC unit for demodulation, Descrambling, LDPC Processing and CRC detachment.

Embodiments herein further disclose a base station for enabling downlink signal transmission in a Multiple-Input Multiple-Output (MU-MIMO) system. The base station comprising a base station scheduler to create a scheduling information based on MU-MIMO Scheduling of a plurality of User equipments (UES), a UE multiplexer for multiplexing the plurality of UES paired based on the scheduling decisions across time, frequency and code, a Cyclic Redundancy Check (CRC) unit configured to input to transport blocks of each UE pushed on to a Downlink shared channel (DLSCH) and perform bit processing of each of the CRC encoded UEs, a data modulator to receive Code-rate (MCS) for data modulation mapping on a post bit processed data, a Scheduling Aware UE Port Mapping Unit to assign DM-RS ports to the UE based on allocated MCS and number of antenna ports from a scheduling information structure, enable optimal channel estimation at UE by adding new DM-RS port combinations using reserved fields in the DCI messaging, create DM-RS references for each UE based on a DM-RS base sequence followed by a CDM Spreading according to a port assignment, map the DM-RS references to resource elements based on DM-RS configurations from the scheduling information structure, a partial port occupancy information unit to add a Partial Port Occupancy information (P-Poi) along with the scheduler information structure that is required at the UE for demodulation and to transmit the scheduling information along with the per UE P-Poi to the UE over a communication channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method to enable improved Channel estimation quality for some ports Downlink for partially loaded DM-RS ports without compromising the estimation performance on the other ports. Referring now to the drawings, and more particularly to FIGS. 3A through 5, where similar reference characters denote corresponding features consistently throughout the figures, there are shown preferred embodiments.

In one aspect, the embodiments herein disclose a method of enhancing the overall throughput or fairness with improved Channel Estimation on selected MU-MIMO ports in downlink transmission. The different reference signals for the users in a MU-MIMO group which may or may not occupy the same set of resources are called reference signal ports. The method comprises Scheduling aware DM-RS port allocation to ensure the allocation of ports for users in a predefined specific order. Scheduling aware port allocation herein involves the allocation of ports to users based on the scheduling information like MCS and the number of users sharing the same time-frequency. The DM-RS ports thus allocated allow the receiver to de-spread the received pilots such that some ports get the benefit with an increased number of distinct channel estimates. The method further comprises intimating UEs in the MU-MIMO system, using the DCI, to enable or disable frequency de-spreading based on the partially allocated DMRS ports. The UE intimated of the partially allocated group gets the increased number of distinct Channel estimates by bypassing the frequency despreading process. This is especially helpful in the case of frequency selective channels, as this causes an increase in the number of distinct channel estimates because the Frequency Domain CDM (FD-CDM) de-spreading is no longer required in the receiver side of the MU-MIMO ports. Such a de-spreading with a lower spreading factor is allowed because the OCCs used in 5G NR DM-RS can be seen as codes in the branches of an Orthogonal Variable Spreading Factor (OVSF) code tree. Further, the increased number of distinct channel estimates improve the mean-squared error of the frequency interpolator for channels with high selectivity. This can translate to a block error rate (BLER) improvement for the associated ports. This in turn can also enable upgradation to a higher-order modulation scheme or a higher code rate, which could improve the fairness if the associated port had a lower order modulation or code rate than the others. Alternately, the improvement in BLER corresponds to an improvement in throughput.

Figure 3A:
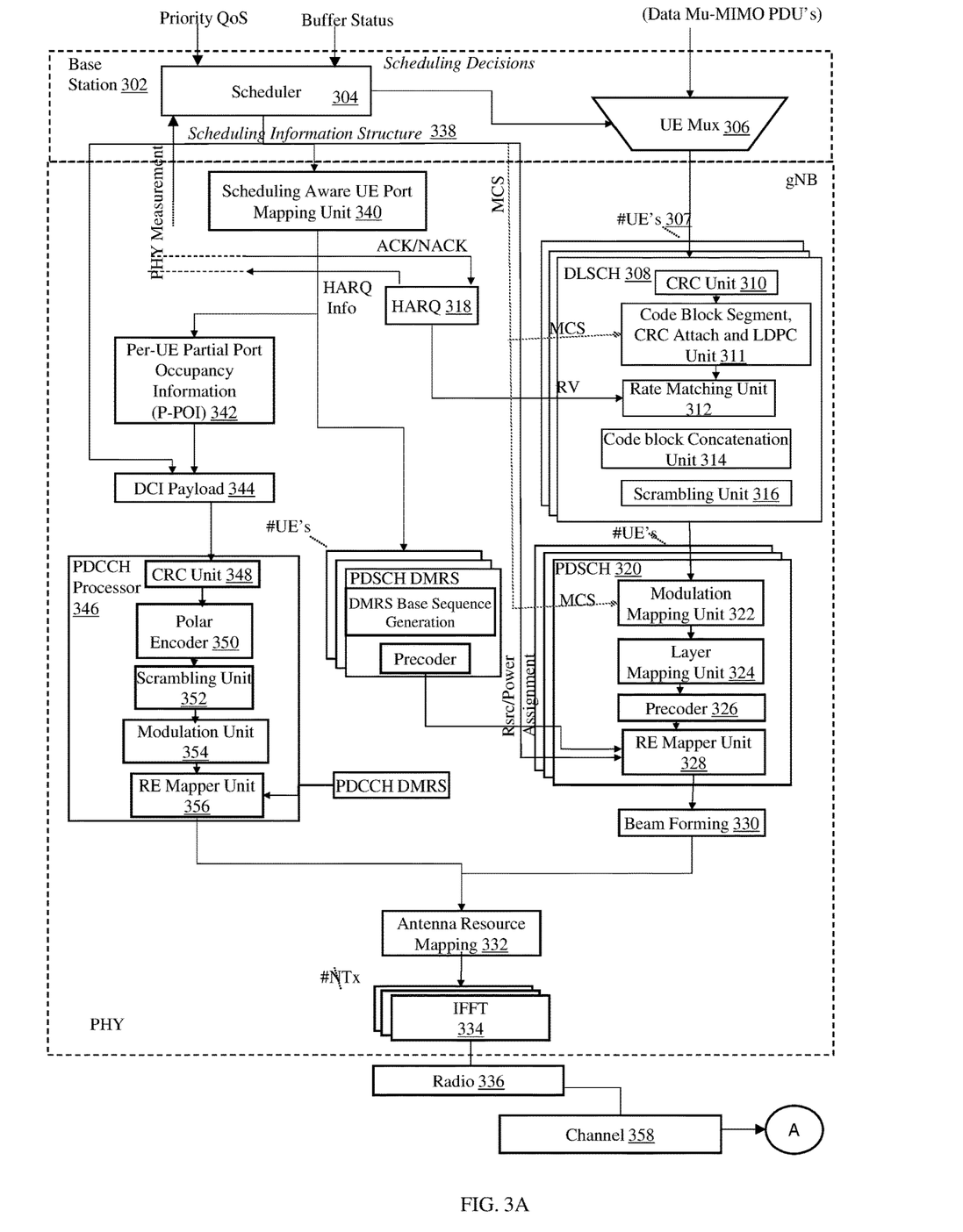
FIGS. 3A-3B are structural block diagrams illustrating downlink transmission in MU-MIMO systems to which embodiments of the present disclosure can be applied.
Figure 3B:
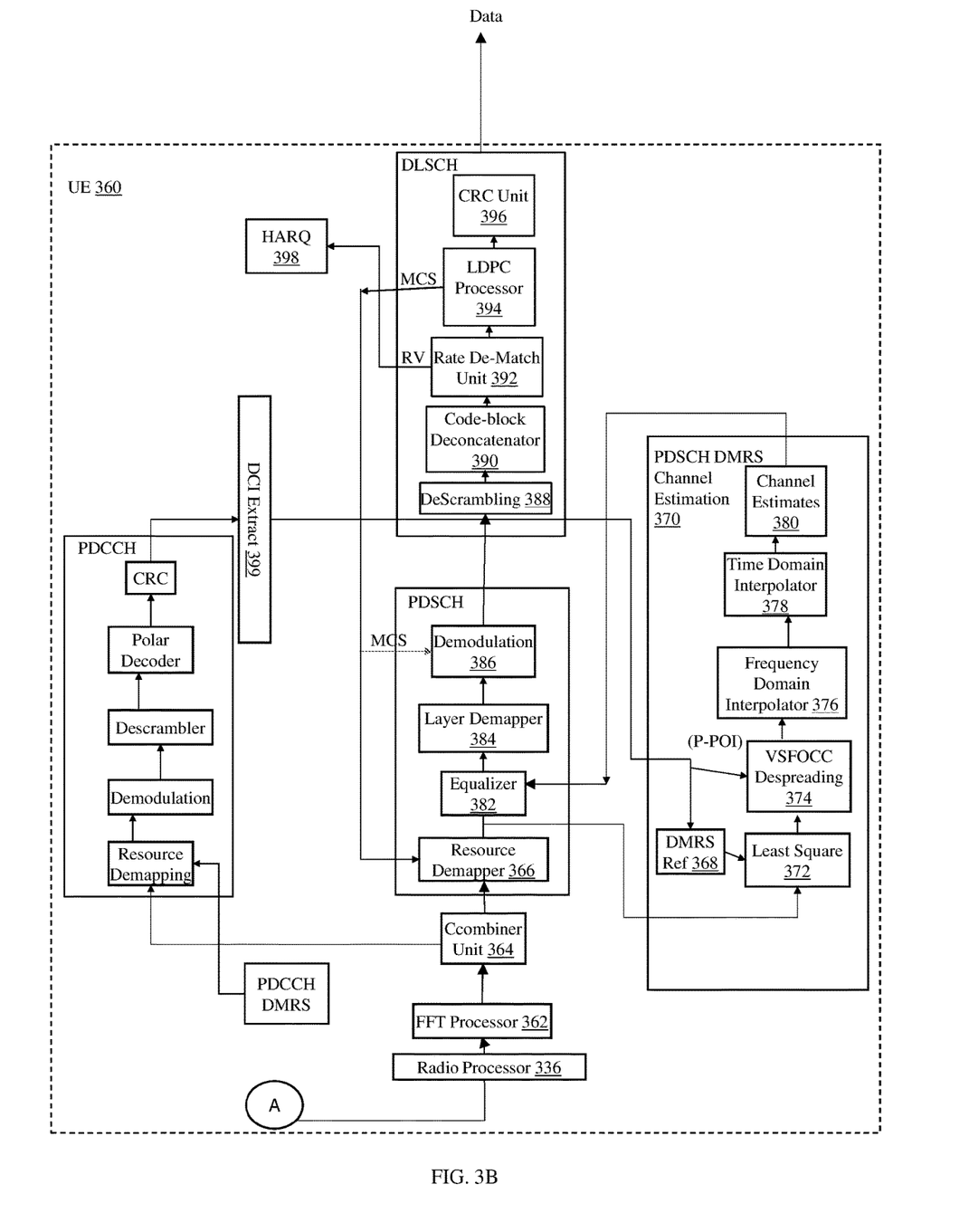

FIGS. 3A-3B are block diagrams illustrating downlink transmission signal chain in conventional MU-MIMO systems to which embodiments of the present disclosure can be applied. In the downlink flow based on the PHY Measurements, buffer status of the downlink PDU from higher layers, and the Priority QoS, the Scheduler creates the scheduling information and the scheduling decisions like the user pairing, user layers, MCS, resource assignment across time-frequency grids etc. According to the embodiments herein, the MU-MIMO Scheduling of the users is considered. Based on the scheduling decisions the paired UEs are multiplexed across time, frequency and code, and the transport blocks of these UES are fed to the Physical Layer. These transport blocks for each UE are subjected to CRC encoding followed by bit processing steps which involve the Code Block segmentation, LDPC Encoding, Rate-Matching, Code-block concatenation and Scrambling. HARQ Processes for each transport block are managed by storing different Redundancy version (RV) of the data for each code-block corresponding to the transport block for retransmissions. The transmission of the data corresponding to the specific RV index is managed by the HARQ process. The Code-rate (MCS) for the LDPC and rate-matching is intimated in the Scheduling Information Structure. The Data modulation mapping is applied on the post bit processed data followed by Layer Mapping, Precoding and Resource Mapping. MCS is also used to select the required Modulation. The PDSCH resources to be mapped to a time-frequency grid are derived from the Scheduling Information. The PDSCH data generated from all the UEs are combined through the Precoder or Beamformer and mapped to antennae through the Antenna Mapping and then subjected to IFFT and Radio Processing. The DM-RS port assignment of the present disclosure uses a Scheduling Aware UE Port Mapper where the UEs, Corresponding Layers, Allocated MCS and the number of Antenna ports from the Scheduling Information structure used for appropriately assigning the DM-RS ports. Further the additional messaging needs to be added per UE in the form of Partial port Occupancy information (P-Poi) and this is added along with the other scheduler information structure that is required at the UE for Demodulation. In addition, this requires the addition of the new DM-RS port combinations to enable optimal channel estimation at UE and this is done by using the reserved fields in the DCI Messaging. DM-RS References per UE are created based on the DM-RS base sequence followed by the CDM Spreading done according to the port assignment. These DM-RS References are mapped to the resource elements based on the DM-RS Configurations from the scheduling information structure. The PDCCH Processing consisting of the CRC, Polar Encoding, Scrambling Modulation and Resource Mapper is used to send the scheduling information along with the per UE P-POI as disclosed herein.

The main functions at the UE include FFT to convert to the Frequency domain, the PDCCH Processing to extract the DCI Information containing the scheduling information which is used in the PDSCH Demodulation. The combiner followed by resource de-mapper separates the PUSCH and the DM-RS References from the frequency-time grid with the DM-RS Configurations and the resource configurations provided by the DCI Extracted data. Conventional DM-RS Channel estimation involves least-square, OCC Despreading, Frequency domain interpolation with denoising and Time domain Interpolation. In this patent, the proposal is to get an increased number of finer channel estimates and improved estimates by dynamically reducing the despreading factor in the OCC stage (Variable Spreading Factor OCC) based on the Partial port occupancy Information provided by the DCI extraction. The details of this VSFOCC are covered in Section 4.1.3. These Channel Estimates are further fed to the Equalizer module followed by Demodulation, Scrambling, LDPC Processing and CRC detachment. HARQ retransmissions are scheduled based on the CRC failures and soft data corresponding to HARQ process is maintained in the HARQ Buffer. Further details of HARQ, and essential features like PSS or SS Synchronization, PDCCH or Coreset Search, PBCH, MIB or SIB etc is out of scope for the current document.

During the downlink transmission, the scheduler 304 in the base station 302 creates scheduling decisions based on the MU-MIMO Scheduling of the users. Based on the scheduling decisions, the paired UEs are multiplexed by the UE multiplexer 306 across time, frequency and code, and the transport blocks of the UES 307 are fed to the Downlink shared channel (DLSCH) 308. These transport blocks for each UE passed on to Cyclic Redundancy Check (CRC) unit 310 are subjected to CRC encoding. The CRC encoded UES 307 are subjected to bit processing steps, which involve the Code Block segmentation, CRC attach and LDPC Encoding in the Code Block unit 311, Rate-Matching in the rate-matching unit 312, Code-block concatenation and Scrambling in the code block concatenation unit 314 and scrambling unit 316 respectively. HARQ Processes 318 for each transport block 306 is managed by storing different Redundancy version (RV) of the data for each code-block 310 corresponding to the transport block 306 for retransmissions. The transmission of the data corresponding to the specific RV index is managed by the HARQ process. The Code-rate (MCS) for the LDPC and rate-matching is intimated in the Scheduling Information Structure (PDSCH) 320. The MCS is then inputted to the data modulator 322, where Data modulation mapping is applied on the post bit processed data followed by Layer Mapping in the layer mapper unit 324, Precoding by the precoder 326 and Resource Mapping in resource mapper unit 328. MCS is also used to select the required Modulation. The PDSCH resources 320 to be mapped to a time-frequency grid are derived from the Scheduling Information. The PDSCH data generated from all the UEs are combined through the Precoder 326 or Beamformer 330 and mapped to antennae through the Antenna resource Mapping unit 332 and is then subjected to Inverse Fast Fourier transform (IFFT) in IFFT unit 334 and Radio Processing in radio processor 336.

According to the embodiments herein, the port assignment is performed using a Scheduling Aware UE Port Mapping Unit 340 where the UEs, corresponding layers, allocated MCS and the number of antenna ports from the Scheduling Information structure 338 are used for appropriately assigning the DM-RS ports. Further, the additional messaging needs to be added per UE in the form of Partial Port Occupancy information (P-Poi) in the Partial Port Occupancy information unit 342. The Partial Port Occupancy information (P-Poi) is then added along with the other scheduler information structure 338 that is required at the UE for Demodulation. In addition, this requires the addition of the new DM-RS port combinations as DM-RS payload 344 to enable optimal channel estimation at UE and this is done by using the reserved fields in the DCI Messaging. DM-RS References per UE are created based on the DM-RS base sequence followed by the CDM Spreading done according to the port assignment. These DM-RS References are mapped to the resource elements based on the DM-RS Configurations from the scheduling information structure 338. The PDCCH Processor 346 comprises of the CRC Unit 348, Polar Encoder 350, Scrambling Unit 352, Modulation Unit 354 and Resource Mapper Unit 356 for redundancy checking, Polar Encoding, Scrambling Modulation and Resource Mapping of the scheduling information and to transmit the scheduling information along with the per UE P-POI to the UE 360 over the communication channel 358 according to embodiments of the present disclosure.

The main functions at the UE include a Discrete Fourier Transform (FFT)-domain signal processor 362 to convert to the Frequency domain, the PDCCH Processing to extract the DCI Information containing the scheduling information which is used in the PDSCH Demodulation. The combiner unit 364 followed by resource de-mapper 366 separates the PUSCH and the DM-RS References 368 from the frequency-time grid with the DM-RS Configurations and the resource configurations provided by the DCI Extracted data. Proposed DM-RS Channel estimation 370 involves least-square 372, Variable Spreading Factor OCC (VSFOCC) Despreading 374, Frequency domain interpolation at Frequency domain interpolator 376 with denoising and Time domain Interpolation in Time domain Interpolator 378. Conventionally the DMRS Channel estimation involves OCC based despreading.

The embodiments of the present disclosure focus on getting an increased number of finer channel estimates at the channel estimator 380 and improved estimate quality by dynamically reducing the despreading factor in the OCC stage (Variable Spreading Factor OCC) based on the Partial port occupancy information provided by the DCI extractor 399. These Channel Estimates are further fed to the Equalizer 382, layer mapper 384 and demodulator 386, descrambler 388, code-block desegmenter 390, rate de-match unit 392, LDPC processor 394, and CRC unit 396 for demodulation, Descrambling, LDPC Processing and CRC detachment. HARQ retransmissions are scheduled based on the CRC failures and soft data corresponding to HARQ process is maintained in the HARQ Buffer 398.

Figure 4:
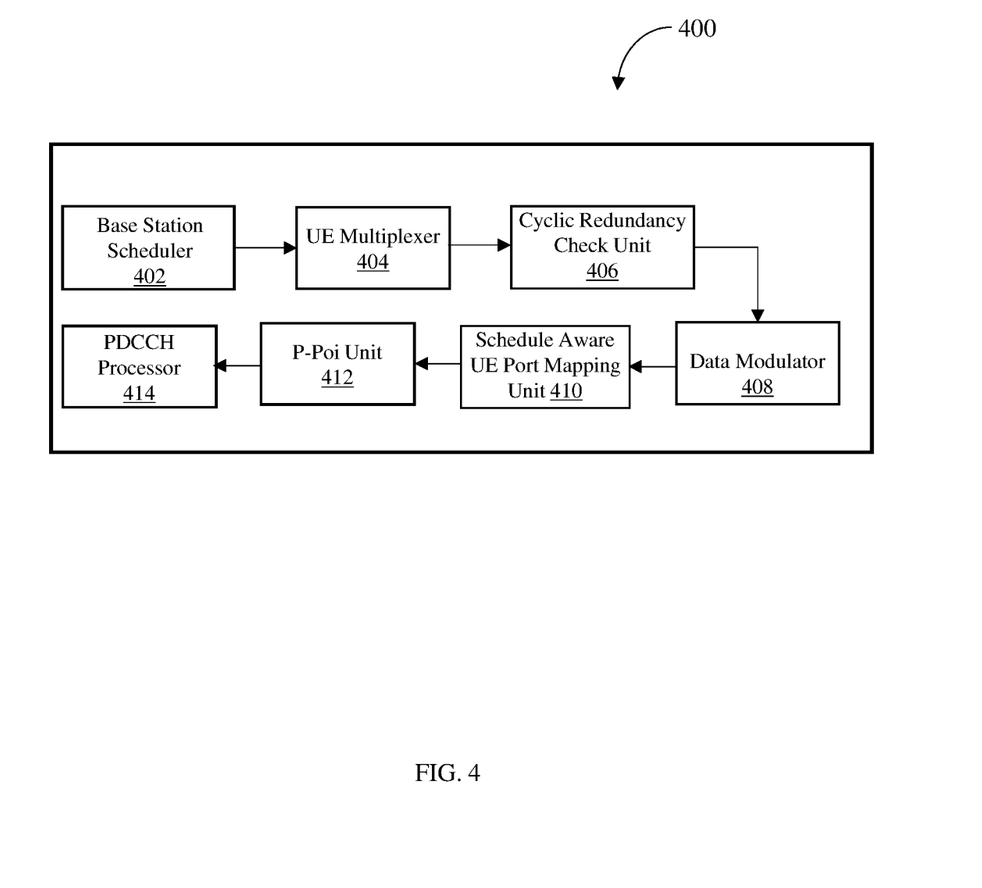
FIG. 4 is a block diagram illustrating functional units of a base station for enabling downlink signal transmission in a Multiple-Input Multiple-Output (MU-MIMO) system, according to the embodiments herein.

FIG. 4 is a block diagram of a Multi-user, multiple-input, multiple-output (MU-MIMO) system in downlink translation enabling DM-RS port allocation to improve channel estimation, according to the embodiments herein. The base station 400 for enabling downlink signal transmission in a Multiple-Input Multiple-Output (MU-MIMO) system comprises of a base station scheduler 402, a UE multiplexer 404, a cyclic redundancy check unit (CRC) 406, a data modulator 408, a Scheduling Aware UE Port Mapping Unit 410, partial port occupancy information unit 412 and a Physical Downlink Control Channel (PDCCH) processor 414.

The base station scheduler 402 generates a scheduling information based on MU-MIMO Scheduling of a plurality of User equipments (UES). The User Equipment (UE) multiplexer 404 multiplexes the plurality of UES paired based on the scheduling decisions across time, frequency and code. The Cyclic Redundancy Check (CRC) 406 is configured to perform cyclic redundancy check of transport blocks of each UE pushed on to a Downlink shared channel (DLSCH) and perform bit processing of each of the CRC encoded UEs. The data modulator 408 performs data modulation mapping on a post bit processed data based on inputs Code-rate (MCS) received from the CRC unit 406. The Scheduling Aware UE Port Mapping Unit 410 is configured to assign DM-RS ports to the UE based on allocated MCS and number of antenna ports from a scheduling information structure, enable optimal channel estimation at UE by adding new DM-RS port combinations using reserved fields in the DCI messaging, create DM-RS references for each UE based on a DM-RS base sequence followed by a CDM Spreading according to a port assignment and map the DM-RS references to resource elements based on DM-RS configurations from the scheduling information structure. The partial port occupancy information unit 412 is configured to add Partial Port Occupancy information (P-Poi) along with the scheduler information structure that is required at the UE for demodulation and transmit the scheduling information along with the per UE P-Poi to the UE over a communication channel.

According to the embodiments herein, the Physical Downlink Shared Channel (PDSCH) processor processes the data generated for radio processing in a radio processor. The Physical Downlink Control Channel (PDCCH) processor comprises of a Cyclic Redundancy Check (CRC) Unit, a Polar Encoder, Scrambling Unit, Modulation Unit and Resource Mapper Unit for redundancy checking, Polar Encoding, Scrambling Modulation and Resource Mapping of the scheduling information and to transmit the scheduling information along with the per UE P-POI to the UE over a communication channel. Here the transmission of data corresponding to a specific RV index is managed by a Hybrid automatic repeat request (HARQ) process, where HARQ process for each transport block is managed by storing different Redundancy version (RV) of the data for each code-block corresponding to the transport block for retransmissions. The channel estimates are inputted to one or more of an equalizer unit, layer mapper unit, a demodulator unit for demodulation a descrambler unit for descrambling, a code-block de-segmented unit for desegmenting, a rate de-match unit, an LDPC processor for LDCP processing and the CRC unit CRC detachment.

Figure 5:
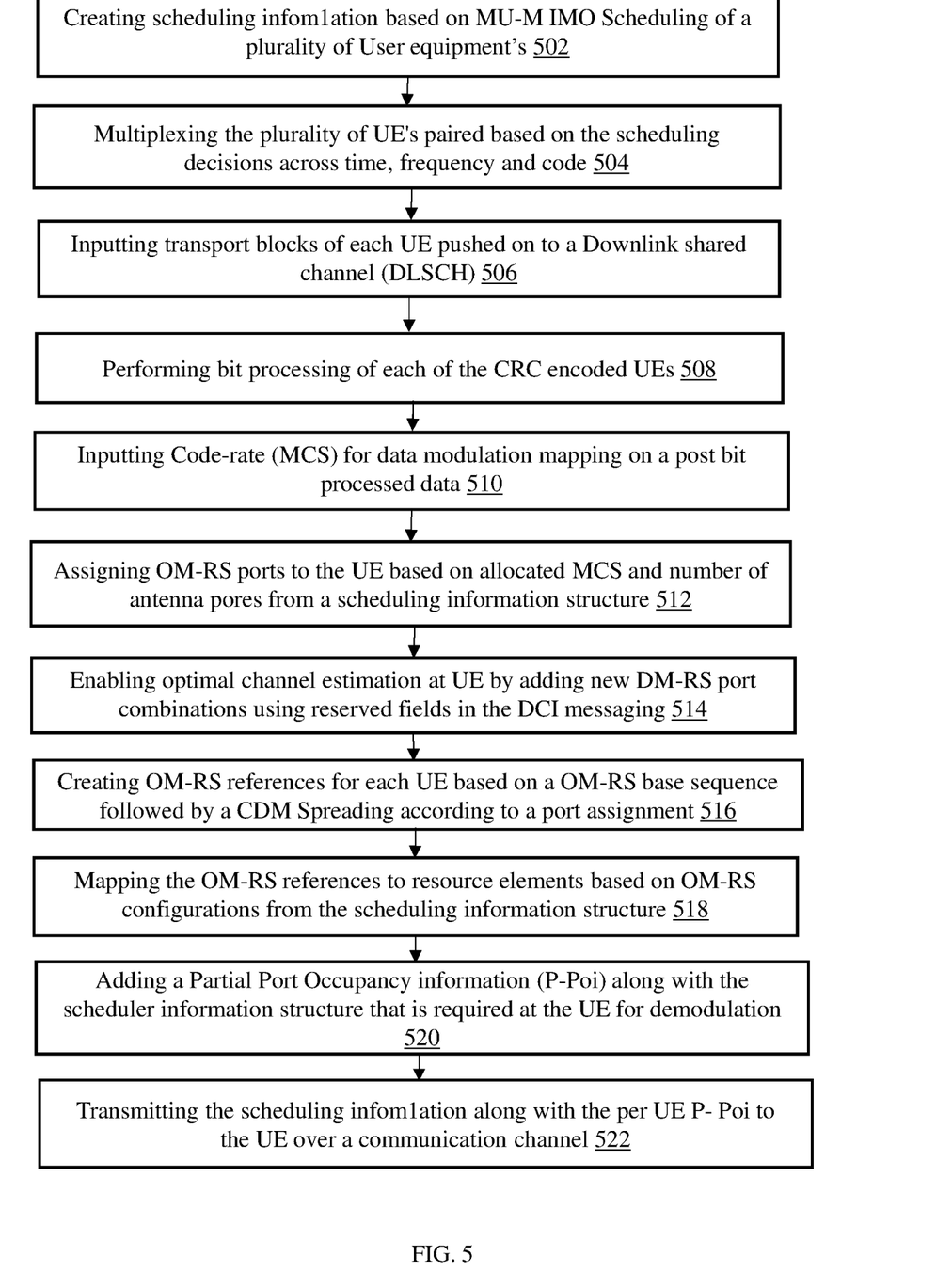
FIG. 5 is a flow chart illustrating a method for enabling downlink signal transmission improving channel estimation for multi-user, multiple-input, multiple-output (MU-MIMO) systems through dynamic port allocation, according to the embodiments herein.

FIG. 5 is a flow chart illustrating a method for enabling downlink signal transmission improving channel estimation for multi-user, multiple-input, multiple-output (MU-MIMO) systems through dynamic port allocation, according to the embodiments herein. The method comprises of creating, a scheduling information based on MU-MIMO Scheduling of a plurality of User equipments (UES) at step 502, multiplexing, by a UE multiplexer, the plurality of UES paired based on the scheduling decisions across time, frequency and code at step 504, inputting, to a Cyclic Redundancy Check (CRC) unit, transport blocks of each UE pushed on to a Downlink shared channel (DLSCH) at step 506, performing bit processing of each of the CRC encoded UEs at step 508, inputting, to a data modulator, Code-rate (MCS) for data modulation mapping on a post bit processed data at step 510, assigning, by a Scheduling Aware UE Port Mapping Unit, DM-RS ports to the UE based on allocated MCS and number of antenna ports from a scheduling information structure at step 512, adding, a Partial Port Occupancy information (P-Poi) for each UE along with the scheduler information structure required for demodulation at UE at step 514, enabling optimal channel estimation at UE by adding new DM-RS port combinations using reserved fields in the DCI messaging at step 516, creating DM-RS references for each UE based on a DM-RS base sequence followed by a CDM Spreading according to a port assignment at step 518, mapping the DM-RS references to resource elements based on DM-RS configurations from the scheduling information structure at step 520, adding, by a partial port occupancy information unit, a Partial Port Occupancy information (P-Poi) along with the scheduler information structure that is required at the UE for demodulation at step 522 and transmitting the scheduling information along with the per UE P-Poi to the UE over a communication channel at step 524.

For the purposes of the embodiments of the present disclosure, the following abbreviations apply:

| Abbreviations | Description |
| --- | --- |
| PDU | Protocol Data Unit |
| MCS | Modulation & Coding Scheme |
| P-Poi | Partial Port Occupancy Information |
| VSFOCC | Variable Spreading Factor Orthogonal Cover Codes |
| DM-RS | Demodulation Reference Signal |
| OVSF | Orthogonal Variable Spreading Factor |
| MSE | Mean Squared Error |
| OCC | Orthogonal Cover Codes |
| PDSCH | Physical Downlink Shared Channel |
| PDCCH | Physical Downlink Control Channel |
| DCI | Downlink Control Information |
| CDM | Code Division Multiplexing |
| MU-MIMO | Multi-User Multiple Input Multiple Output |

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A method of enabling downlink signal transmission in a Multiple-Input Multiple-Output (MU-MIMO) system, comprising:

creating, by a base station scheduler, a scheduling information based on MU-MIMO Scheduling of a plurality of User Equipments (UEs);

multiplexing, by a UE multiplexer, the plurality of UEs paired based on the scheduling decisions across time, frequency and code;

inputting, to a Cyclic Redundancy Check (CRC) unit, transport blocks of each UE pushed on to a Downlink shared channel (DLSCH);

performing bit processing of each of the CRC encoded UEs;

inputting, to a data modulator, Code-rate (MCS) for data modulation mapping on a post bit processed data;

assigning, by a Scheduling Aware UE Port Mapping Unit, Demodulation Reference Signal (DM-RS) ports to the UE based on allocated MCS and number of antenna ports from a scheduling information structure;

enabling optimal channel estimation at UE by adding new DM-RS port combinations using reserved fields in the Downlink Control Information (DCI) messaging;

creating DM-RS references for each UE based on a DM-RS base sequence followed by a Code Division Multiplexing (CDM) Spreading according to a port assignment;

mapping the DM-RS references to resource elements based on DM-RS configurations from the scheduling information structure;

adding, by a partial port occupancy information unit, a Partial Port Occupancy information (P-Poi) along with the scheduler information structure that is required at the UE for demodulation; and transmitting the scheduling information along with the per UE P-Poi to the UE over a communication channel.

2. The method of claim 1 further comprising:
enabling improved channel estimation at UE, by adding one or more additional DM-RS port combinations using reserved fields in DCI messaging.

3. The method of claim 1, wherein transmission of data corresponding to a specific RV index is managed by a Hybrid automatic repeat request (HARQ) process, where HARQ process for each transport block is managed by storing different Redundancy version (RV) of the data for each code-block corresponding to the transport block for retransmissions.

4. The method of claim 3, wherein the HARQ retransmissions are scheduled based on the CRC failures and data corresponding to HARQ process maintained in an HARQ Buffer.

5. The method of claim 1, further comprising:
combining, a Physical Downlink Shared Channel (PDSCH) data generated for a radio processing in a radio processor.

6. The method of claim 5, wherein a Physical Downlink Control Channel (PDCCH) processor comprises of a Cyclic Redundancy Check (CRC) Unit, a Polar Encoder, Scrambling Unit, Modulation Unit and Resource Mapper Unit for redundancy checking, Polar Encoding, Scrambling Modulation and Resource Mapping of the scheduling information and to transmit the scheduling information along with the per UE P-POI to the UE over a communication channel.

7. The method of claim 1, wherein bit processing of the CRC encoded UES comprises of:

Code Block segmentation, CRC attach and low-density parity-check (LDPC) Encoding in a Code Block unit;

Rate-Matching in the rate-matching unit; and

Code-block concatenation in the code block concatenation unit; and

Scrambling in a scrambling unit.

8. The method of claim 1, wherein the DM-RS ports are assigned based on one or more of UEs, corresponding data layers, allocated MCS and number of antenna ports from a Scheduling Information structure.

9. The method of claim 1, wherein the DM-RS channel estimation comprises of Least square (LS) estimation, Variable Spreading Factor Orthogonal Cover Codes (VSFOCC) Despreading, Frequency domain interpolation in Frequency domain, interpolator with denoising in time domain interpolation in a Time domain interpolator.

10. The method of claim 1, further comprising:
inputting the channel estimates to one or more of an equalizer unit, layer mapper unit, a demodulator unit, a descrambler unit, a code-block de-segmented unit, a rate de-match unit, an LDPC processor and a CRC unit for demodulation, Descrambling, LDPC Processing and CRC detachment.

11. A base station for enabling downlink signal transmission in a Multiple-Input Multiple-Output (MU-MIMO) system, comprising:
a base station scheduler to generate a scheduling information based on MU-MIMO Scheduling of a plurality of User Equipments (UEs);
a User Equipment (UE) multiplexer to multiplex the plurality of UEs paired based on the scheduling decisions across time, frequency and code;
a Cyclic Redundancy Check (CRC) unit to:
enable cyclic redundancy check of transport blocks of each UE pushed on to a Downlink shared channel (DLSCH);
perform bit processing of each of the CRC encoded UEs;
a data modulator to perform data modulation mapping on a post bit processed data based on inputs Code-rate (MCS) received from CRC unit;
a Scheduling Aware UE Port Mapping Unit to:
assign Demodulation Reference Signal (DM-RS) ports to the UE based on allocated MCS and number of antenna ports from a scheduling information structure;
enable optimal channel estimation at UE by adding new DM-RS port combinations using reserved fields in the Downlink Control Information (DCI) messaging;
create DM-RS references for each UE based on a DM-RS base sequence followed by a Code Division Multiplexing (CDM) Spreading according to a port assignment;
map the DM-RS references to resource elements based on DM-RS configurations from the scheduling information structure; and
a partial port occupancy information unit to:
add Partial Port Occupancy information (P-Poi) along with the scheduler information structure that is required at the UE for demodulation; and
transmitting the scheduling information along with the per UE P-Poi to the UE over a communication channel.

12. The base station of claim 11, wherein transmission of data corresponding to a specific RV index is managed by a Hybrid automatic repeat request (HARQ) process, where HARQ process for each transport block is managed by storing different Redundancy version (RV) of the data for each code-block corresponding to the transport block for retransmissions.

13. The base station of claim 11, wherein the HARQ retransmissions are scheduled based on the CRC failures and data corresponding to HARQ process maintained in an HARQ Buffer.

14. The base station of claim 11, further comprising a Physical Downlink Control Channel (PDCCH) processor to combine a Physical Downlink Shared Channel (PDSCH) data generated for radio processing in a radio processor; wherein a Physical Downlink Control Channel (PDCCH) processor comprises of a Cyclic Redundancy Check (CRC) Unit, a Polar Encoder, Scrambling Unit, Modulation Unit and Resource Mapper Unit for redundancy checking, Polar Encoding, Scrambling Modulation and Resource Mapping of the scheduling information and to transmit the scheduling information along with the per UE P-POI to the UE over a communication channel.

15. The base station of claim 11, wherein bit processing of the CRC encoded UES comprises of:
code Block segmentation, CRC attach and low-density parity-check (LDPC) encoding in the Code Block unit;
rate-matching in the rate-matching unit; and
code-block concatenation in the code block concatenation unit; and
scrambling in a scrambling unit.

16. The base station of claim 11, wherein the DM-RS ports are assigned based on one or more of UEs, corresponding data layers, allocated MCS and number of antenna ports from a Scheduling Information structure.

17. The base station of claim 11, wherein the DM-RS channel estimation comprises of Least square (LS) estimation, Variable Spreading Factor Orthogonal Cover Codes (VSFOCC) Despreading, Frequency domain interpolation in Frequency domain, interpolator with denoising and time domain interpolation in a Time domain interpolator.

18. The base station of claim 11, wherein the channel estimates are inputted to one or more of an equalizer unit, layer mapper unit, a demodulator unit for demodulation a descrambler unit for descrambling, a code-block de-segmented unit for desegmenting, a rate de-match unit, an LDPC processor for LDCP processing and the CRC unit CRC detachment.

* * * * *